(No Model.) 2 Sheets—Sheet 1.
W. S. PLUMMER.
MACHINE FOR CUTTING CORN FROM COBS.
No. 523,175. Patented July 17, 1894.
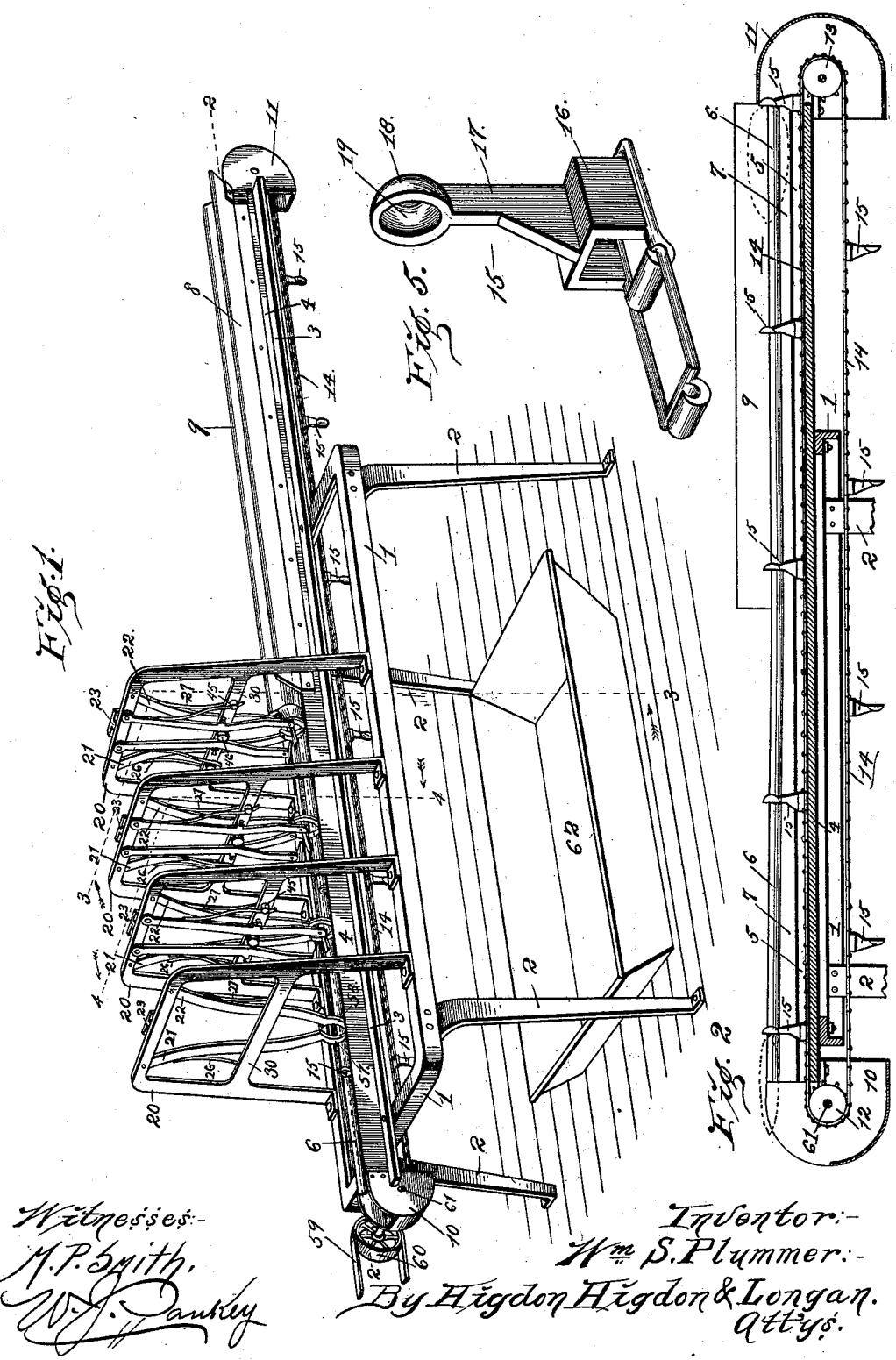
Witnesses:
M. P. Smith.
W. J. Pankey.
Inventor:—
Wm. S. Plummer:—
By Higdon Higdon & Longan.
Att'ys.
THE NORRIS PETERS CO., PHOTO-LITHO., WASHINGTON, D. C.

(No Model.) 2 Sheets—Sheet 2.
W. S. PLUMMER.
MACHINE FOR CUTTING CORN FROM COBS.
No. 523,175. Patented July 17, 1894.
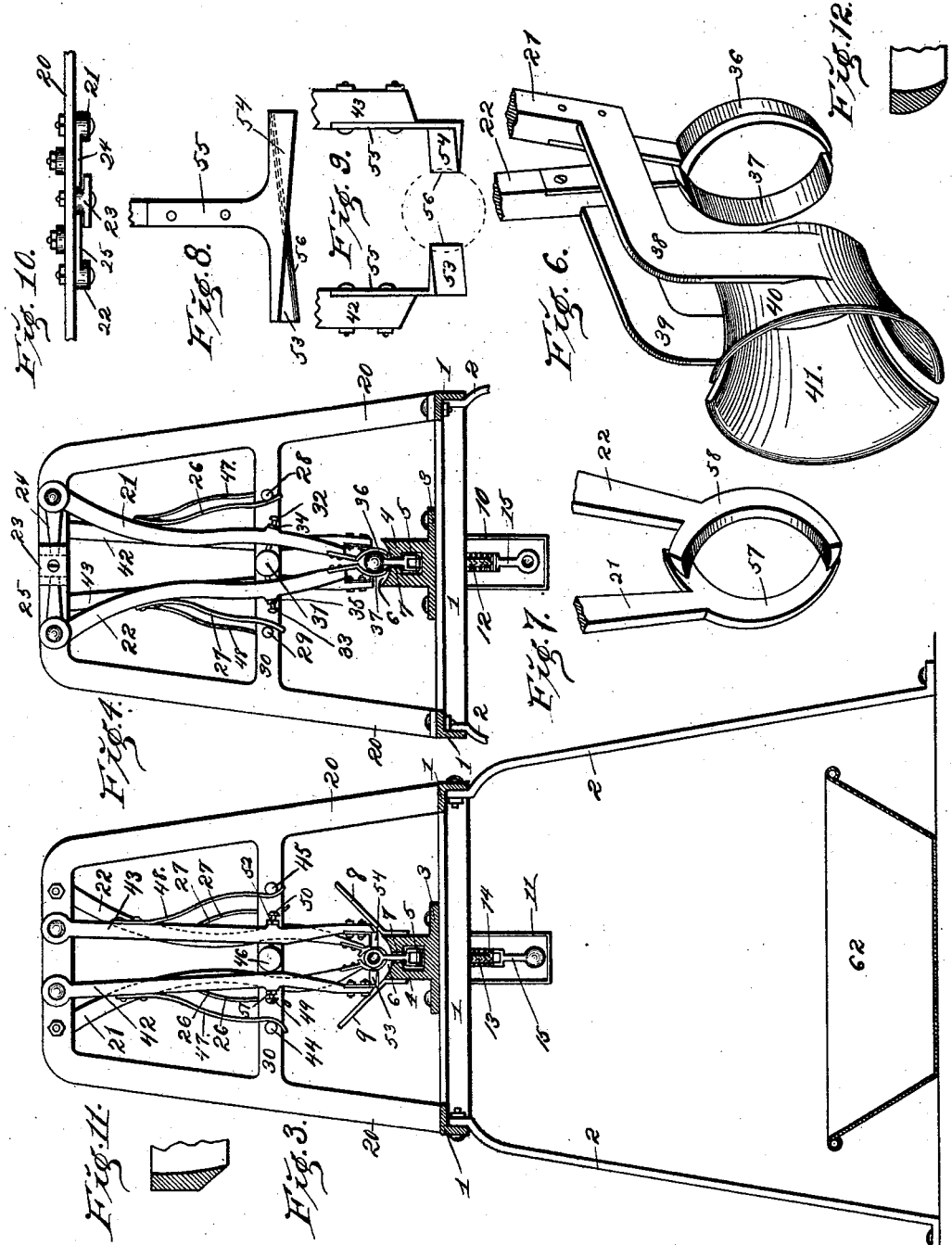
Witnesses:
J. P. Smith.
W. J. Dankey.
Inventor:
Wm. S. Plummer.
By Higdon, Higdon & Longan.
Attys.

UNITED STATES PATENT OFFICE.

WILLIAM S. PLUMMER, OF ST. LOUIS, MISSOURI.

MACHINE FOR CUTTING CORN FROM COBS.

SPECIFICATION forming part of Letters Patent No. 523,175, dated July 17, 1894.

Application filed January 25, 1894. Serial No. 498,061. (No model.)

*To all whom it may concern:*

Be it known that I, WILLIAM S. PLUMMER, of St. Louis, State of Missouri, have invented certain new and useful Improvements in Machines for Cutting Corn from the Cob, of which the following is a full, clear, and exact description, reference being had to the accompanying drawings, forming a part hereof.

The object of my invention is to provide an improved machine for removing by cutting and scraping the corn from the cob, my machine being especially adapted for use in canning factories.

A further object is to provide means for automatically passing ears of corn between a series of especially formed cutting knives and scrapers to remove the corn from the cob and at the same time to impart to the ear of corn a rotating motion by devices hereinafter shown and described.

To the above purposes my invention consists in certain new and novel features of construction that will be hereinafter described and claimed.

In order that my invention may be more fully understood, I will proceed to describe it in detail, reference being had to the accompanying drawings, in which—

Figure 1 is a perspective view of my complete machine in position as required for practical use. Fig. 2 is a longitudinal sectional view taken on the line 2—2 of Fig. 1. Fig. 3 is a cross sectional view taken on the line 3—3 of Fig. 1. Fig. 4 is a cross sectional view taken on the line 4—4 of Fig. 1. Fig. 5 is a perspective view of one of the fingers attached to a portion of the endless carrier such as used in my machine. Fig. 6 is a perspective view of the lower end portions of the first series of arms that the ear of corn comes in contact with. Fig. 7 is a perspective view of the scrapers used on my machine. Fig. 8 is a side elevation of the devices used to impart rotary motion to the ear of corn, Fig. 9 being an end view of the same. Fig. 10 is a top view of the upper portion of one of the upright frames of my machine. Fig. 11 is a cross sectional view of one of the knives and Fig. 12 a cross section view of one of the scrapers such as I use in connection with my machine.

Similar figures refer to similar parts throughout the several views.

The numeral "1" designates the main frame of my machine, which is rectangular in form and angular in cross section. It is mounted upon four legs or standards 2 in any ordinary manner.

A bar or plate 3 has an upwardly extending rectangular portion 4 which has extending longitudinally through its length a rectangular opening 5. The upper side of this portion 4 is grooved, said groove being numbered 6. This portion 4 is inclined longitudinally toward its rear end from a point near the center of said portion 4. A slot 7 connects the rectangular opening 5 with the groove 6.

Angular pieces 8 and 9 are bolted or secured to the sides of the portion 4 and extend from the point where the inclination previously referred to begins to the extreme front end of the machine. These side pieces form a trough into which the ears of corn are deposited. At the extreme ends of this bar 3 are secured semi-circular casings 10 and 11, in which are journaled sprocket-wheels 12 and 13, the casing 10 having a portion removed to allow the discharge of cobs after the corn has been removed from said cobs. An endless carrier 14 travels over the sprocket-wheels 12 and 13. This carrier must necessarily travel through the rectangular opening 5 previously mentioned. At intervals on this endless carrier are secured especially formed fingers 15 for the purpose of engaging against and pushing along the ear of corn after said corn has been deposited within the trough and upon the endless carrier. These fingers have a rectangular base 16 which is cast integral with or secured to a portion of the endless carrier and an upwardly extending portion 17 terminating in a hemispherical cup shaped portion 18, said portion 18 having a cavity 19 therein.

A series of upright frames 20, counterparts of each other, is bolted or secured upon the upper sides of the main frame 1. The first of these upright frames occupies a position immediately in the rear of the terminus of the angles 8 and 9 which form the trough.

The remaining frames occupy positions equidistant from each other and toward the rear of the machine. To the front side of the first frame are pivoted two arms 21 and 22. These extend downward and terminate immediately above the groove 6 in the longitudinal bar 4. A retaining block 23 is bolted to the front side of the upper portion of this forward frame and serves to retain extending lugs 24 and 25 which extend at right angles to and form the arms 21 and 22, thus preventing any lateral movement of the said arms 21 and 22. Pressure springs 26 and 27 are secured respectively to the outer edges of the arms 21 and 22, and passing downwardly engage against lugs 28 and 29 which are formed integral with a cross bar 30, which is located upon a central point on the frame 20. At a central point on the bar 30 is cast a lug 31. Set screws 32 and 33 pass through the arms 21 and 22 and engage against this lug 31. These set screws are provided with locking nuts 34 and 35.

To each of the lower ends of the arms 21 and 22 are secured by bolts or in any suitable manner a pair of cutting knives numbered 36 and 37. These cutting knives are clearly shown in Fig. 6 and in cross section in Fig. 11. By means of the above set-screws, the depth of cut of the said knives may be gaged, or adjusted, as convenience may require.

Right angle arms 38 and 39 are formed integral with the lower ends of the arms 21 and 22 and have secured to their outer ends the halves 40 and 41 of a gage or guide, this gage being immediately in front of the first pair of knives 36 and 37.

On the rear side of the cross bar 30 previously referred to, are cast lugs 44 and 45 also the central lug 46, said lugs being identical with the ones on the opposite side of the bar 30.

Pressure springs 47 and 48 are secured to the outside edge respectively of the arms 42 and 43 which engage against the lugs 44 and 45. These arms 42 and 43 are provided with set screws 49 and 50 which engage against the central lug 46. These set screws 49 and 50 are provided with the locking nuts 51 and 52.

To the extreme lower end of the arms 42 and 43 are bolted or screwed the devices 53 and 54 which cause the ear of corn to rotate while it is being longitudinally moved. These devices consist of an arm 55 having a portion 56 extending longitudinally and at right angles thereto, this portion 56 being knife-edged. As these devices lie parallel in pairs, the knife-edged portion inclines in one direction, while the like portion of the other device inclines in an opposite direction.

The remaining upright frames are fitted in every way similar to the one just described, with the exception that the right angle arms 38 and 39 carrying the guide or gage 40—41 are dispensed with. The last upright frame or the one to the rear of the machine is provided with the arms 21 and 22, extensions 24 and 25, the retaining block 23 and lugs 28, 29 and 31 upon the cross bar 30. The arms 21 and 22 are also provided with the pressure springs 26 and 27 also the set screws 32 and 33 and locking nuts 34 and 35. Formed on or fixed to the extreme lower ends of these arms 21 and 22 are the scrapers 57 and 58 which are clearly shown in Fig. 7 and in cross section in Fig. 12. These scrapers 57 and 58 lie partially within and immediately above the groove 6 in the longitudinal bar 4. By means of the set-screws 32 and 33, the depth of cut of the said scrapers may be gaged, or adjusted, as convenience may require.

A belt 59 running over a belt wheel or pulley 60 which is secured to the shaft 61 carrying the sprocket-wheels 12 imparts motion to the endless carrier 14 of my machine.

A receptacle 62 is provided to receive the corn as it is cut and scraped from the cob.

The practical operation of my device is as follows:—After the endless carrier is in position the corn is deposited in the trough formed by the angle bars 8 and 9 and immediately upon the endless carrier. The fingers 15 of the endless carrier engage an ear of corn and push or carry it forward until it comes to the guide or gage 40—41. The guide or gage 41 being by reason of the pressure springs 26 and 27 closed will, as the corn enters said guide or gage open and allow the ear of corn to pass through against the cutting knives 36 and 37. As the ear is carried along these knives cut a portion of the corn from the cob. Immediately after the front portion of the ear of corn leaves the cutting knives 36 and 37, it is engaged by the rotating devices 53 and 54 previously mentioned. By reason of the peculiar inclination of these rotating devices the ear of corn is given a rotary movement in connection with the longitudinal movement given it by the endless carrier 14. This operation is repeated at each successive pair of cutting knives and rotating devices the ear of corn comes in contact with in its travel along the groove 6, until it reaches the last framework carrying the arms 21 and 22 which, as previously stated, carry the scrapers 57 and 58. Here the remaining corn upon the cob is entirely scraped off.

From the point where the first cutting is made to where the cob is discharged, it will be plainly seen that at each successive pair of cutting knives or scrapers the ear of corn will necessarily become smaller on account of the amount of corn being taken from the cob.

To cause the ear of corn to pass directly through the center of the cutting knives and rotating devices I have as previously stated inclined the rectangular bar 4 from the point where the first operation takes place to its extreme rear end. This inclination is plainly seen in the longitudinal sectional view, Fig. 2. The rectangular portion 16 of the fingers 15 travels within the rectangular opening 5 in the bar 4. The portion 17 traveling in the slot 7 and the hemispherical portion 18 which engaged the ear of corn travels within the groove 6.

Having thus described my invention, what I claim is—

1. The combination of a frame, a horizontally arranged trough having an open bottom, a series of cutting knives supported on said frame oppositely in pairs and each pair in horizontal alignment with the remaining pairs of the series and with the said trough, sprocket-wheels mounted one at the outer end of said trough and the other a distance therefrom upon said frame in alignment with said trough and said pairs of cutting knives, and an endless feeding belt mounted upon said wheels and carrying a series of cups and arranged to force ears of corn from said trough into the space between said pairs of opposite cutting knives consecutively, substantially as herein specified.

2. A machine for cutting and scraping the corn from the cob consisting of a rectangular frame-work having on its top side a bar having a rectangular opening running longitudinally therein, angle bars fastened to said longitudinal bars to form a trough, an endless carrier running through said longitudinal bar and a series of upright frames bolted or secured to the main frame, said upright frames carrying a series of spring actuated arms carrying on their lower extremities cutting and scraping knives and devices for imparting to the ear of corn a rotating movement during its travel along said longitudinal bar, substantially as described and set forth.

3. In a machine for cutting and scraping corn from the cob, a series of upright frames carrying pairs of spring actuated arms having at their lower extremities cutting or scraping knives and devices for rotating an ear of corn during its longitudinal movement and a block secured to the upper portion of said upright frames and blocks to engage a lug on the upper ends of said spring actuated arms for the purpose of preventing any lateral movement of said spring actuated arms, in combination with an endless feeding belt substantially as described and set forth for the purposes stated.

4. A machine for cutting corn from the cob, a rectangular frame-work "1," a plate 3 secured upon the upper side of the rectangular frame, said plate having an upwardly extending portion 4 through which extends the rectangular opening 5, a portion of said bar 4 being inclined, angle bars 8 and 9 forming a trough, an endless carrier 14 carrying the fingers 15, sprocket wheels 12 and 13, said endless carrier traveling the slot 5, upwardly extending frames 20 bolted to the frame 1, said frame 20 carrying spring actuated arms 21 and 22 and 42 and 43, said pairs of arms having at their lower extremities a guide or gage composed of two mating parts 40 and 41, and cutting knives 36 and 37, devices 53 and 54 and scrapers 57 and 58, all substantially as shown and described.

In testimony whereof I affix my signature in presence of two witnesses.

WILLIAM S. PLUMMER.

Witnesses:
E. E. LONGAN,
JNO. C. HIGDON.